J. E. WAKEFIELD.
Assignor to E. W. VAILL.
Folding Rocking-Chair.
No. 8,217. Reissued May 7, 1878.
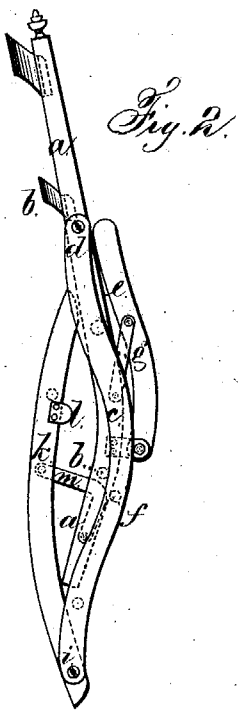
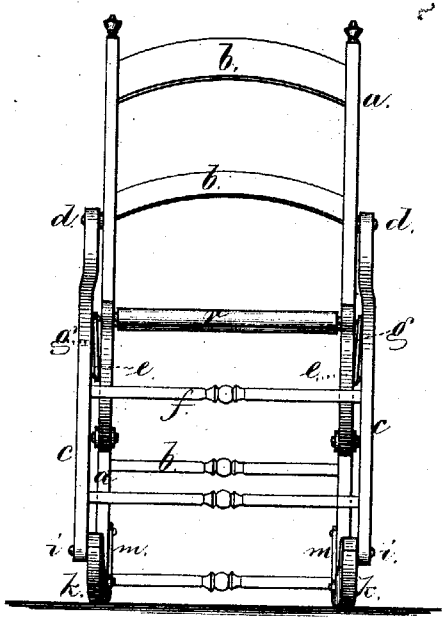
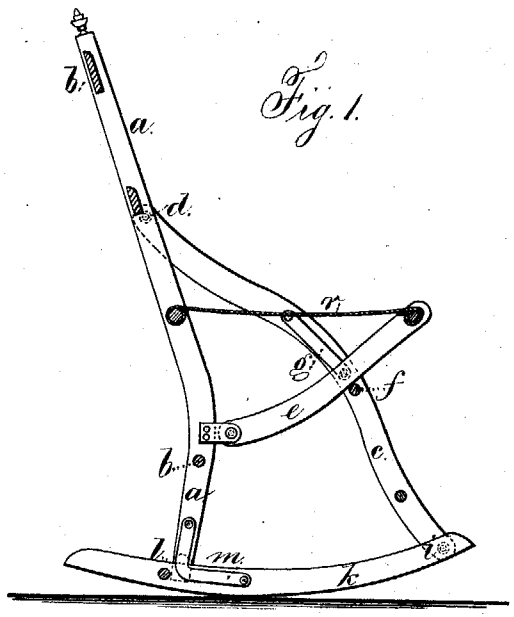
Witnesses
Harold Serrell
Geo. T. Pinckney
Inventor.
John E. Wakefield.
per Lemuel W. Serrell
atty.
N. PETERS, PHOTO-LITHOGRAPHER, WASHINGTON, D. C.

UNITED STATES PATENT OFFICE.

JOHN E. WAKEFIELD, OF WORCESTER, MASSACHUSETTS, ASSIGNOR TO EDWARD W. VAILL.

IMPROVEMENT IN FOLDING ROCKING-CHAIRS.

Specification forming part of Letters Patent No. 179,980, dated July 18, 1876; Reissue No. 8,217, dated May 7, 1878; application filed March 7, 1878.

*To all whom it may concern:*

Be it known that I, JOHN E. WAKEFIELD, of Worcester, in the State of Massachusetts, have invented an Improvement in Folding Rocking-Chairs, of which the following is a specification:

In Letters Patent that have been granted to me July 25, 1876, No. 180,292, a chair is shown with a back and back legs in one frame, with the front legs hinged to the back legs, a swinging seat-frame, a flexible seat, and links or braces from the front legs to the seat-frame.

Rocking-chairs have been made with the back legs in two parts, jointed together so as to be capable of folding.

My present invention relates to a rocking-chair in which the back and back legs are made as one frame, extending down to the rockers, and connected therewith, and in which the front legs also are connected with the rockers, and extend upward and backward, and the parts are connected so as to fold into a small compass.

In the drawing, Figure 1 is a section of the folding chair complete. Fig. 2 is an elevation of the chair as folded, and Fig. 3 is a front elevation.

The back and back legs form one frame, composed of the side pieces *a* and cross-pieces *b*, which may be plain or ornamental, or the back may be caned or upholstered.

From the back frame the seat-frame *e* projects forwardly and supports the front part of the seat *r*, such seat-frame *e* being pivoted to the back so as to fold.

The front legs *c* are pivoted at *i* to the rockers *k*, and they support the seat-frame and extend backwardly, and at *d* the front legs and back are represented as pivoted together.

The links *g* are provided between the seat-frame *e* and the front legs *c*, in order that the seat-frame may be swung upwardly and toward the back as the legs *a* and *c* are folded toward each other, and when unfolded the seat-frame *e* is supported by the front legs by being retained between the cross-bar *f* and the lower ends of such links *g*.

In order to allow for the rocker to be folded in connection with the chair, the back legs are pivoted to the rockers by the links *m*, which are represented as L-shaped, so as to cause them to lie against the surfaces of the leg and rocker, respectively, when the chair is unfolded for use; but such links might be straight or curved.

The lower ends of the legs *a* are shown as resting upon the upper surfaces of the rockers between the plates *l* and links *m*, and these plates might have holes in them for the insertion of screws to prevent the chair being folded when adapted for use.

I claim as my invention—

1. In a folding rocking-chair, the back and back legs formed as one frame, extending down to the rockers, in combination with the front legs, pivoted to the rockers and extending backwardly to and supporting the back, and the seat-frame and seat supported by the front and back legs, substantially as set forth.

2. The combination, in a folding rocking-chair, of the back legs and frame *a b*, front legs *c*, seat-frame *e*, links *g* and *m*, and seat *r*, and rockers *k*, substantially as set forth.

3. The L-shaped links, in combination with the back legs and rockers of the folding chair, substantially as set forth.

Signed by me this 28th day of February, A. D. 1878.

JOHN E. WAKEFIELD.

Witnesses:

FREDK. J. BARNARD,
GEORGE R. CUTLER.